(12) United States Patent
Lee

(10) Patent No.: US 7,593,973 B2
(45) Date of Patent: Sep. 22, 2009

(54) METHOD AND APPARATUS FOR TRANSFERRING SNAPSHOT DATA

(75) Inventor: Kent Lee, Ladera Ranch, CA (US)

(73) Assignee: Dot Hill Systems Corp., Carlsbad, CA (US)

( * ) Notice: Subject to any disclaimer, the term of this patent is extended or adjusted under 35 U.S.C. 154(b) by 137 days.

(21) Appl. No.: 11/560,174

(22) Filed: Nov. 15, 2006

(65) Prior Publication Data
US 2008/0114951 A1    May 15, 2008

(51) Int. Cl.
*G06F 17/00* (2006.01)
(52) U.S. Cl. ................... 707/204; 707/200
(58) Field of Classification Search ........... None
See application file for complete search history.

(56) References Cited

U.S. PATENT DOCUMENTS

| | | | |
|---|---|---|---|
| 5,963,962 | A | 10/1999 | Hitz et al. |
| 6,289,356 | B1 | 9/2001 | Hitz et al. |
| 6,292,808 | B1 | 9/2001 | Obermarck et al. |
| 6,557,079 | B1 | 4/2003 | Mason, Jr. et al. |
| 6,615,223 | B1 | 9/2003 | Shih et al. |
| 6,771,843 | B1 | 8/2004 | Huber et al. |
| 7,100,089 | B1 | 8/2006 | Phelps |
| 7,165,156 | B1 * | 1/2007 | Cameron et al. ............ 711/162 |
| 7,191,304 | B1 | 3/2007 | Cameron et al. |
| 7,373,366 | B1 * | 5/2008 | Chatterjee et al. .......... 707/204 |
| 2002/0091670 | A1 | 7/2002 | Hitz et al. |
| 2003/0154314 | A1 | 8/2003 | Mason et al. |
| 2003/0158863 | A1 * | 8/2003 | Haskin et al. ............... 707/200 |
| 2003/0167380 | A1 | 9/2003 | Green et al. |
| 2003/0191745 | A1 | 10/2003 | Jiang et al. |
| 2003/0229764 | A1 | 12/2003 | Ohno et al. |
| 2004/0030727 | A1 | 2/2004 | Armangau |
| 2004/0030846 | A1 | 2/2004 | Armangau et al. |
| 2004/0030951 | A1 | 2/2004 | Armangau |
| 2004/0054131 | A1 | 3/2004 | Ballinger et al. |
| 2004/0093555 | A1 | 5/2004 | Therrien et al. |
| 2004/0133718 | A1 | 7/2004 | Kodama et al. |

(Continued)

FOREIGN PATENT DOCUMENTS

CA    2165912    6/1997

(Continued)

OTHER PUBLICATIONS

Written Opinion from the PCT dated Mar. 27, 2007 with regard to corresponding PCT Application No. PCT/US/06/32506, 10 pages.

(Continued)

*Primary Examiner*—Uyen T. Le
(74) *Attorney, Agent, or Firm*—Sheridan Ross P.C.

(57) ABSTRACT

A method, device, and system are provided for the efficient transfer of snapshot data during a snapshot delete action. The snapshot data to be deleted may have an older version of the same snapshot and that older snapshot may need to access the data from the newer snapshot. Instead of copying all of the snapshot data of the snapshot that is being deleted to the older snapshot, only pointers to the data are copied to the older snapshot. Additionally, snapshot data can be accessed for read functions or the like while the snapshot pointers are being copied to the older snapshot.

20 Claims, 7 Drawing Sheets

U.S. PATENT DOCUMENTS

| | | |
|---|---|---|
| 2004/0172509 A1 | 9/2004 | Takeda et al. |
| 2004/0260673 A1 | 12/2004 | Hitz et al. |
| 2004/0267836 A1 | 12/2004 | Armangau et al. |
| 2005/0044088 A1 | 2/2005 | Lindsay et al. |
| 2005/0066128 A1 | 3/2005 | Yagisawa et al. |
| 2005/0071393 A1 | 3/2005 | Ohno et al. |
| 2005/0122791 A1 | 6/2005 | Hajeck |
| 2005/0166022 A1 | 7/2005 | Watanabe |
| 2005/0182910 A1 | 8/2005 | Stager et al. |
| 2005/0193180 A1 | 9/2005 | Fujibayashi et al. |
| 2005/0198452 A1 | 9/2005 | Watanabe |
| 2005/0240635 A1 | 10/2005 | Kapoor et al. |
| 2005/0246397 A1 | 11/2005 | Edwards et al. |
| 2005/0246503 A1 | 11/2005 | Fair |
| 2006/0155946 A1 | 7/2006 | Ji |
| 2006/0271604 A1* | 11/2006 | Shoens ........................ 707/201 |
| 2007/0100808 A1* | 5/2007 | Balogh ............................ 707/3 |
| 2007/0266066 A1* | 11/2007 | Kapoor et al. .............. 707/205 |

FOREIGN PATENT DOCUMENTS

| | | |
|---|---|---|
| EP | 1003103 | 5/2000 |
| WO | WO9429807 | 12/1994 |
| WO | WO2005111773 | 11/2005 |
| WO | WO2005111802 | 11/2005 |

OTHER PUBLICATIONS

International Search Report from the PCT dated Mar. 27, 2007 with regard to corresponding PCT Application No. PCT/US/06/32506, 3 pages.

International Search Report from the PCT dated Aug. 7, 2008 with regard to corresponding PCT Application No. PCT/US/08/57326, 2 pages.

Written Opinion from the PCT dated Aug. 7, 2008 with regard to corresponding PCT Application No. PCT/US/08/57326, 6 pages.

International Preliminary Report on Patentability and Written Opinion from the PCT dated Mar. 20, 2008 with regard to corresponding PCT Application No. PCT/US/06/32506, 10 pages.

Notice of Allowance in U.S. Appl. No. 11/277,738, Mar. 20, 2008, 6 pages.

Office Action in U.S. Appl. No. 11/277,738, Dec. 6, 2007, 9 pages.

Office Action in U.S. Appl. No. 11/277,738, Jul. 31, 2007, 8 pages.

Office Action in U.S. Appl. No. 11/277,738, Apr. 3, 2007, 14 pages.

Official Action for U.S. Appl. No. 11/624,524, mailed Dec. 11, 2008.

Official Action for U.S. Appl. No. 11/747,109, mailed Mar. 9, 2009.

* cited by examiner

METHOD AND APPARATUS FOR TRANSFERRING SNAPSHOT DATA

FIELD

The present invention is directed to data storage management. In particular, the present invention is directed to methods and apparatuses for deleting a snapshot while allowing other devices to access the snapshot data during the deletion process.

BACKGROUND

The need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In order to facilitate the availability of desired data, it is often advantageous to maintain different versions of a data storage volume. Indeed, data storage systems are available that can provide at least limited data archiving through backup facilities and/or snapshot facilities. The use of snapshot facilities greatly reduces the amount of storage space required for archiving large amounts of data. However, there are still times where it is desirable to delete a snapshot to conserve storage space. An older snapshot may need data from a snapshot being deleted because master volume data is often only written to the newest snapshot when a write to the master volume data occurs. This fact leaves open the possibility that the older snapshot does not contain all of the preserved data from the master volume for the point in time when the older snapshot was taken. When a snapshot is being deleted, an older snapshot may need to access data from the snapshot being deleted. To accommodate this need in the past, all of the data from the snapshot being deleted that is needed by an older snapshot and is not on the older snapshot was copied to the older snapshot in a first step. Then after all of the qualified data from the snapshot being deleted was copied, the data of the deleted snapshot could be deleted. The process of copying the data from the snapshot being deleted to the older snapshot is burdensome due to the large amount of data that is being copied.

Also troublesome is the fact that no other device can access either the data being copied or the older snapshot receiving the copied data during the copying process due to the possibility of data corruption. When a read and/or write command for snapshot data being copied is received at a storage controller, the controller has to wait until the copying process is complete before executing the read and/or write command. Often times, it can take minutes or hours to copy snapshot data to an older snapshot, which means the read and/or write command can be delayed by minutes or hours. Waiting for hours or even minutes to execute a read and/or write command is generally not acceptable in current data storage systems.

SUMMARY

The present invention is directed to solving these and other problems and disadvantages of the prior art. In accordance with embodiments of the present invention, a service for efficiently deleting snapshot data while simultaneously allowing access to such data is provided. In one embodiment, a method of deleting snapshot data is provided. The method generally includes the steps of receiving a command to delete a first snapshot and determining that a second snapshot exists that is older than the first snapshot. The second snapshot may need to access data from the first snapshot in which case a table entry containing at least one pointer to data from the first snapshot is copied from the first snapshot and stored as part of the second snapshot. After the table entry containing the pointer has been transferred from the first snapshot to the second snapshot, the corresponding table entries from the first snapshot can be deleted from the backing store. Table entries and pointers are generally much smaller than the data they point to and therefore table entries can be copied and transferred much more quickly than the actual data. If it is possible to achieve the same result of copying the data by copying the table entry, the overall copy process time can be greatly reduced.

In accordance with other embodiments of the present invention, access to data of the snapshot that is being deleted is allowed during the copying and deleting process. In one embodiment, the copying step is performed in a piecewise manner allowing access to all portions of the snapshot data other than the portion corresponding to the pointer that is currently being copied. In this embodiment a locking function is employed that locks the portion being copied. The locking function ensures that the portion being copied cannot be read or written to, which would likely result in data corruption.

In accordance with further embodiments of the present invention, a device for controlling a storage system and particularly for managing snapshot delete commands is provided. In one embodiment, the device includes a memory having a snapshot delete application. The snapshot delete application includes a locking function for locking a first portion of data related to a first snapshot while the first snapshot is being deleted and simultaneously allowing access to a second portion of data related to the first snapshot. The snapshot delete application may also include a copy function for copying the locked first portion of data from the first snapshot to a second older snapshot. A processor also residing on the device may execute the snapshot delete application when a command to delete a snapshot is received.

Additional features and advantages of embodiments of the present invention will become more readily apparent from the following description, particularly when taken together with the accompanying drawings.

DETAILED DESCRIPTION

In accordance with embodiments of the present invention, a snapshot is a block level point-in-time representation of data on a storage volume. The data is essentially frozen in time at the instant that the snapshot is taken. Although data on the storage volume may change as a result of write operations, the data within the snapshot will remain constant and frozen in time at the instant that the snapshot was taken. In order to preserve snapshot data, a backing store is used to store data that is not otherwise represented in the storage volume and snapshot metadata. All data and metadata associated with the snapshot is stored in the backing store. In accordance with embodiments of the present invention, data is stored within the snapshot in "chunks." A chunk is equivalent to a number of Logical Block Addresses (LBAs). Alternatively or in addition, data can be stored within subchunks. A subchunk is a fixed size subset of a chunk. Pointers or table entries can be used to identify the location of a chunk in the backing store. Accordingly, when possible, the pointers or table entries pointing to a chunk, subchunk, or any multiple thereof can be copied from a snapshot being deleted to an older snapshot.

Figure 1:
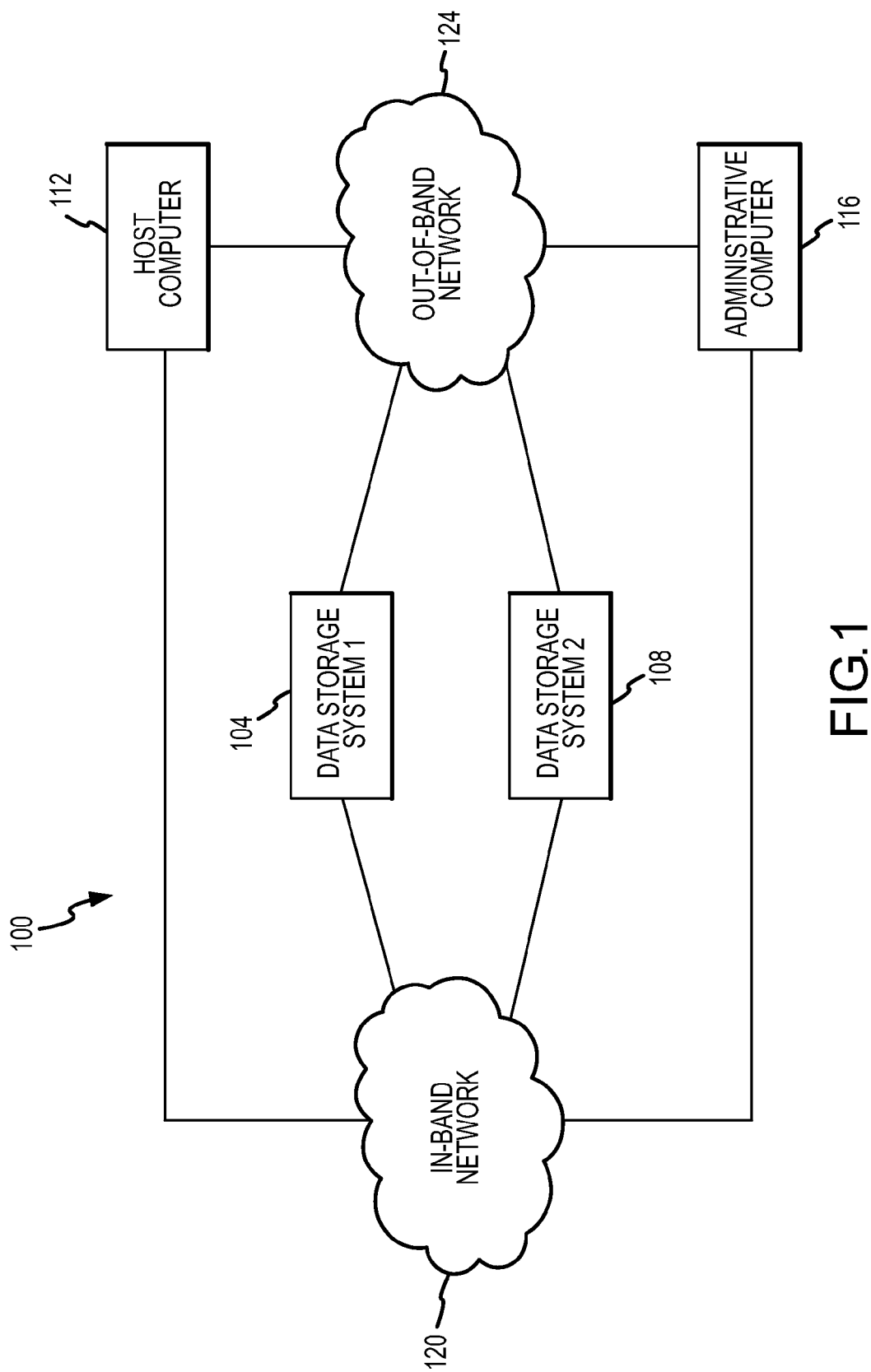
FIG. 1 is a functional block diagram depicting components of an electronic data system incorporating one or more data storage systems in accordance with embodiments of the present invention.

FIG. 1 is a block diagram depicting an electronic data system 100 in accordance with embodiments of the present invention incorporating a first data storage system 104 and a second data storage system 108. The electronic data system 100 may also include one or more host processors, computers or computer systems 112. In addition, the electronic data system 100 may include or may be interconnected to an administrative computer 116. As will be appreciated by one of skill in the art after consideration of the present disclosure, embodiments of the present invention have application in association with single or multiple hosts 112 in storage area network (SAN) or direct connect environments.

The data storage systems 104, 108 are typically interconnected to one another through an in-band network 120. The in-band network 120 may also interconnect the data storage systems 104, 108 to a host computer 112 and/or an administrative computer 116. The electronic data system 100 may also include an out-of-band network 124 interconnecting some or all of the electronic data system 100 nodes 104, 108, 112 and/or 116. For example, one or more host computers 112 are connected to each data storage system 104, 108. For instance, a first data storage system 104 is connected to a second data storage system 108 across some distance by a Fibre Channel or a TCP/IP network 120, and each of these data storage systems 104, 108 is connected to a host computer 112 through an in-band 120 and/or an out-of-band 124 network.

The in-band or storage area network 120 generally functions to transport data between data storage systems 104 and/or 108 and host devices 112, and can be any data pipe capable of supporting multiple initiators and targets. Accordingly, examples of in-band networks 120 include Fibre Channel (FC), iSCSI, parallel SCSI, Ethernet, ESCON, or FICON connections or networks, which may typically be characterized by an ability to transfer relatively large amounts of data at medium to high bandwidths. The out-of-band network 124 generally functions to support the transfer of communications and/or commands between various network nodes, such as data storage resource systems 104, 108, host computer 112, and/or administrative computers 116, although such data may also be transferred over the in-band communication network 120. Examples of an out-of-band communication network 124 include a local area network (LAN) or other transmission control protocol/Internet protocol (TCP/IP) network. In general, the out-of-band communication network 124 is characterized by an ability to interconnect disparate nodes or other devices through uniform user interfaces, such as a web browser. Furthermore, the out-of-band communication network 124 may provide the potential for globally or other widely distributed management of data storage systems 104, 108 via TCP/IP.

Every electronic data system node or computer 104, 108, 112 and 116, need not be interconnected to every other node or device through both the in-band network 120 and the out-of-band network 124. For example, no host computer 112 needs to be interconnected to any other host computer 112, data storage system 104, 108, or administrative computer 116 through the out-of-band communication network 124, although interconnections between a host computer 112 and other devices 104, 108, 116 through the out-of-band communication network 124 are not prohibited. As another example, an administrative computer 116 may be interconnected to at least one storage system 104 or 108 through the out-of-band communication network 124. An administrative computer 116 may also be interconnected to the in-band network 120 directly, although such an interconnection is not required. For example, instead of a direct connection, an administrator computer 116 may communicate with a controller of a data storage system 104, 108 using the in-band network 120.

In general, a host computer 112 exchanges data with one or more of the data storage systems 104, 108 in connection with the performance of the execution of application programming, whether that application programming concerns data management or otherwise. Furthermore, an electronic data system 100 may include multiple host computers 112. An administrative computer 116 may provide a user interface for controlling aspects of the operation of the storage systems 104, 108. The administrative computer 116 may be interconnected to the storage system 104, 108 directly, and/or through a bus or network 120 and/or 124. In accordance with still other embodiments of the present invention, an administrative computer 116 may be integrated with a host computer 112. In addition, multiple administrative computers 116 may be provided as part of the electronic data system 100. Furthermore, although two data storage systems 104, 108 are shown in FIG. 1, an electronic data system 100 may include more than two data storage systems or may include a single data storage system.

Figure 2:
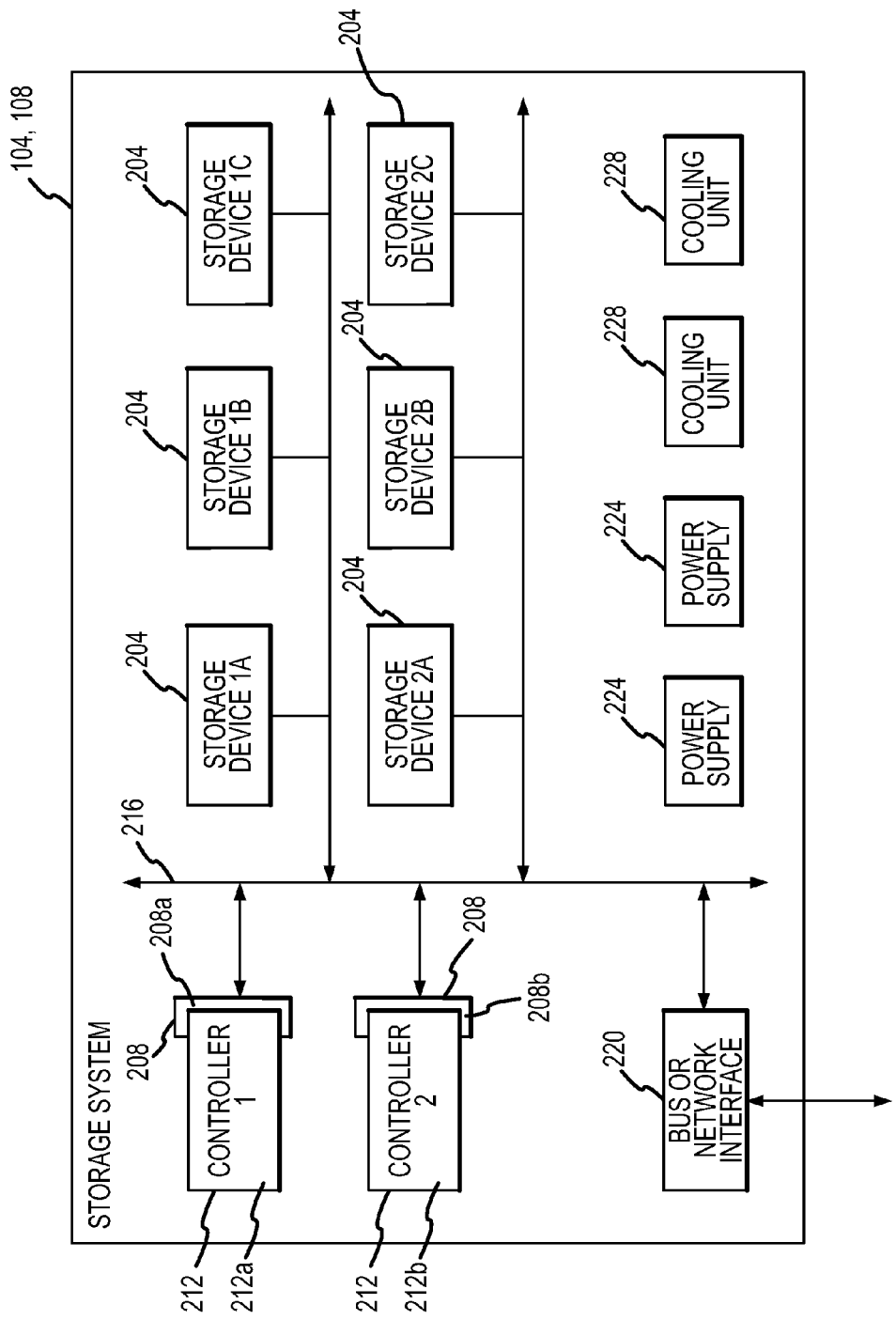
FIG. 2 is a block diagram depicting components of a data storage system in accordance with embodiments of the present invention.

FIG. 2 illustrates components that may be included in a data storage system 104, 108 in accordance with embodiments of the present invention. In general, the data storage system 104, 108 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 204 include magnetic tape storage devices, optical storage devices or solid state disk devices. Furthermore, although a number of storage devices 204 are illustrated, it should be appreciated that embodiments of the present invention are not limited to any particular number of storage devices 204, and that a lesser or greater number of storage devices 204 may be provided as part of a data storage system 104. As can be appreciated by one of skill in the art, one or more arrays and/or array partitions, hereinafter referred to as logical unit numbers (LUNs) comprising a storage volume, may be established on the data storage devices 204. As can be further appreciated by one of skill in the art, a LUN may be implemented in accordance with any one of the various array levels or other arrangements for storing data on one or more storage devices 104. As can also be appreciated by one of skill in the art, the storage devices 204 may contain data comprising a master storage volume, which may correspond to a LUN, in addition to one or more snapshots of the master storage volume taken at different times. As can further be appreciated by one of skill in the art, snapshots may comprise metadata and data stored in a backing store on the storage devices 204. As can also be appreciated by one of skill in the art, the storage devices 204 contain data comprising a master storage volume, which may correspond to a LUN, and one or more snapshots of the storage volume taken at different times. In one embodiment, the snapshots may be mapped to the LUNs and stored on a backing store. However, the backing store, which also occupies an array and/or array partition, does not have a LUN number assigned to it, thus making the backing store invisible to a host computer 112 and/or administrative computer 116.

A data storage system 104, 108 in accordance with embodiments of the present invention may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104, 108. Furthermore, a data storage system 104, 108 in accordance with embodiments of the present invention includes at least one controller 212a. For example, while the data storage system 104, 108 is operated in a single controller, non-failover mode, the data storage system 104, 108 may include exactly one controller 212. A data storage system 104, 108 in accordance with other embodiments of the present invention may be operated in a dual redundant active-active controller mode by providing a second controller 212b. When a second controller 212b is used in addition to a first controller 212a, the second controller slot 208b receives the second controller. As can be appreciated by one of skill in the art, the provision of two controllers, 212a to 212b, permits data to be mirrored between the controllers 212a-212b, providing redundant active-active controller operation.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104 include one or more power supplies 224 and one or more cooling units 228. In addition, a bus or network interface 220 may be provided to interconnect the data storage system 104, 108 to the bus or network 112, and/or to a host computer 108 or administrative computer 116.

Although illustrated as a complete RAID system in FIG. 2, it should be appreciated that the data storage system 104, 108 can comprise one or more storage volumes implemented in various other ways. For example, the data storage system 104, 108 may comprise a hard disk drive or other storage device 204 connected or associated with a server or a general purpose computer. As further examples, the storage system 104 may comprise a Just a Bunch of Disks (JBOD) system or a Switched Bunch of Disks (SBOD) system.

Figure 3:
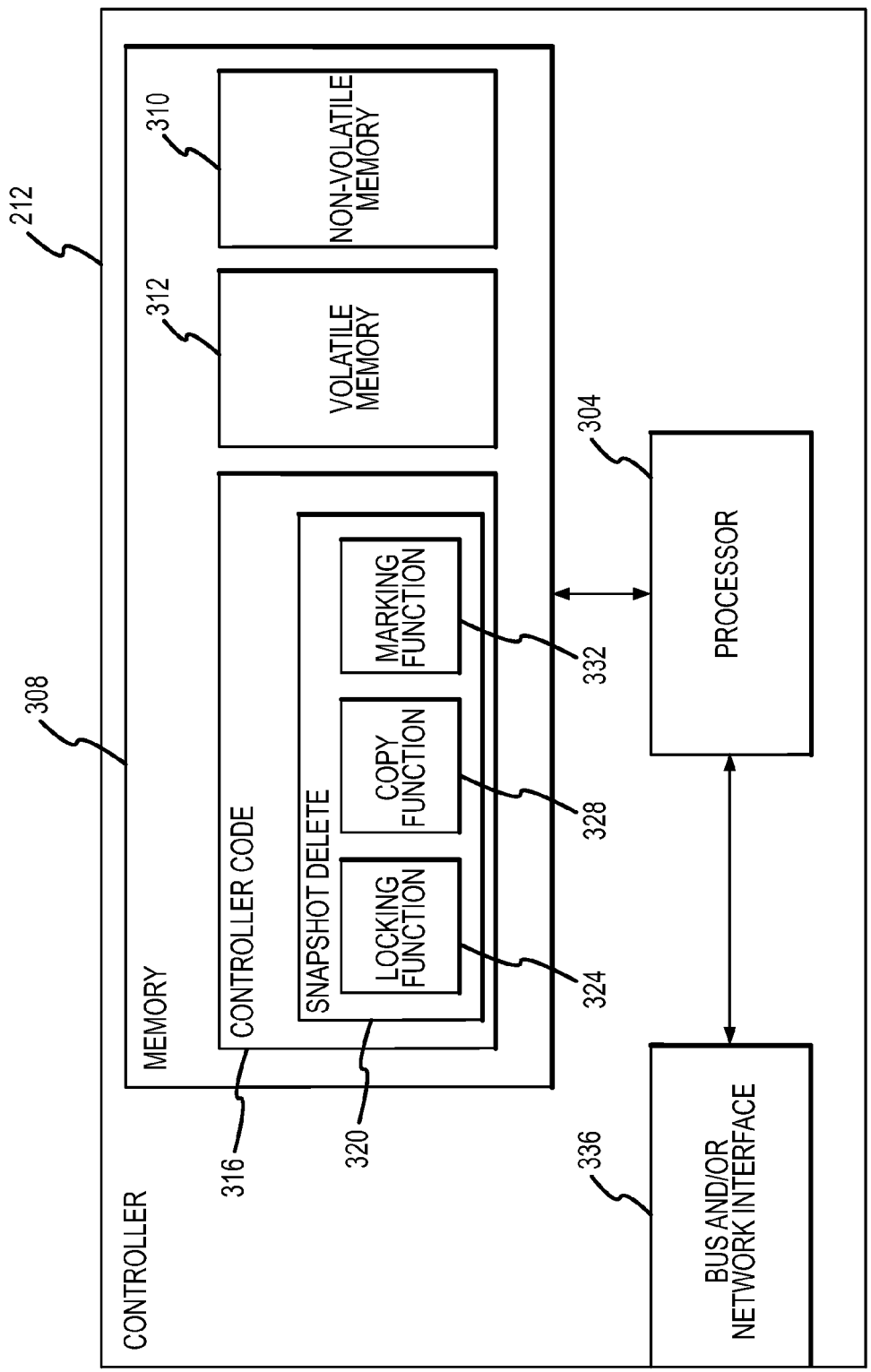
FIG. 3 is a block diagram depicting components of a storage controller in accordance with embodiments of the present invention.

FIG. 3 illustrates aspects of a storage controller 212 in accordance with embodiments of the present invention. In general, a storage controller 212 includes a processor subsystem 304 capable of executing instructions for performing, implementing and or controlling various controller 212 functions. Such instructions may include instructions for implementing aspects of a snapshot delete method and apparatus. Furthermore, such instructions may be stored as software and/or firmware. As can be appreciated by one of skill in the art, operations concerning the generation of parity data or other operations may be performed using one or more hard-wired and/or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example a processor subsystem may comprise a complex programmable logic device (CPLD).

A controller 212 also generally includes memory 308. The memory 308 is not specifically limited to memory of any particular type. For example, the memory 308 may comprise a solid-state memory device, or a number of solid-state memory devices. In addition, the memory 308 may include separate non-volatile memory 310 and volatile memory 312 portions. As can be appreciated by one of skill in the art, the memory 308 may include a write cache and a read cache that are provided as part of the volatile memory 312 portion of the memory 308, although other arrangements are possible. By providing caches, a storage controller 212 can improve the speed of input/output (IO) operations between a host 108 and the data storage devices 204 comprising an array or array partition. Examples of volatile memory 312 include DRAM and SDRAM.

The non-volatile memory 310 may be used to store data that was written to the write cache of memory 308 in the event of a power outage affecting the data storage system 104. The non-volatile memory portion 310 of the storage controller memory 308 may include any type of data memory device that is capable of retaining data without requiring power from an external source. Examples of non-volatile memory 310 include, but are not limited to, compact flash or other standardized non-volatile memory devices.

The memory 308 also includes portions of the memory 308 comprising a region that provides storage for controller code 316. The controller code 316 may comprise a number of components, including a snapshot delete process or application 320 comprising instructions for deleting a snapshot from a backing store as described herein. The snapshot delete application 320 may itself include or be associated with a number of modules or components. Examples of such components that may be included in the snapshot delete application 320 include, but are not limited to, a locking function 324, a copy function 328, and a marking function 332. The locking function 324 is generally used to lock a portion of the snapshot being deleted so as to prevent any usage of such data while the copy function 328 is copying the same portion of data. The locking function 324 serves to protect the data from being corrupted during transit from a snapshot that is being deleted to an older snapshot. The marking function 332 generally indicates how far the delete process has completed. That is, a snapshot LBA that is the same or below the watermark of the marking function 332 is either deleted or moved to an older snapshot. If a snapshot LA is higher than the watermark, then the delete process has not processed that LBA yet. The controller code region 316 may be established in the volatile memory 312 portion and/or the non-volatile memory 310 of the storage controller memory 308.

A storage controller 212 may additionally include other components. For example, a bus and/or network interface 336 may be provided for operably interconnecting the storage controller 212 to the remainder of the data storage system 104, for example through a controller slot 208 and a bus or channel 216. Furthermore, the interface 336 may be configured to facilitate removal or replacement of the storage controller 212 in a controller slot 208 as a field replaceable unit (FRU). In addition, integral signal and power channels may be provided for interconnecting the various components of the storage controller 212 to one another.

Figure 4:
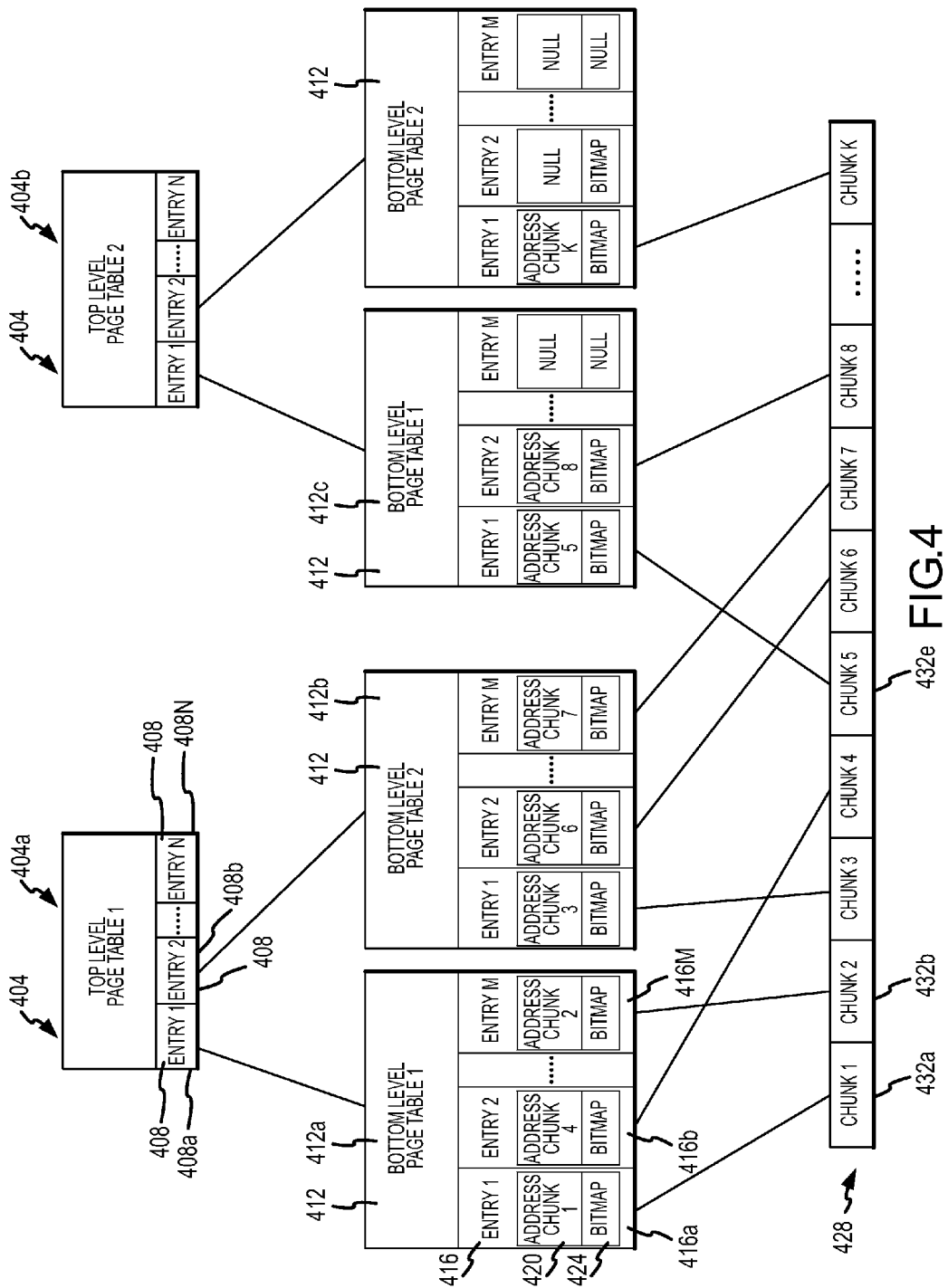
FIG. 4 is a block diagram depicting an exemplary data structure employed for storing snapshots in accordance with embodiments of the present invention.

FIG. 4 depicts a data structure employed in association with the storage of snapshot data on a backing store. A Top Level Page Table (TLPT) 404 is created when a snapshot is taken of a master volume. A snapshot represents a point in time of the master volume when the snapshot is taken. A newer snapshot of the master volume is represented by the first TLPT 404a and an older snapshot of the same master volume is represented by the second TLPT 404b. In one embodiment, preserved master data is only copied to the newest snapshot when there is a write of data to the master volume. As a result of this, it is possible that the older snapshot represented by the second TLPT 404b does not contain a pointer or table entry for all data from the master volume at the time the older snapshot was taken. Rather, data stored on the master volume at the time the older snapshot was taken may be preserved in association with the first TLPT 404a if that data was not written until after the newer snapshot was taken. As can be appreciated, the number of TLPTs 404 stored depends upon the number of snapshots taken and the memory capacity of the backing store.

A TLPT 404 generally comprises a list of pointers, where each pointer points to a different Bottom Level Page Table (BLPT) 412. The pointers to each BLPT 412 are typically stored in the TLPT 404 as a TLPT Entries (TLPTEs) 408. Each TLPTE 408 does not necessarily need to point to a BLPT, meaning that a TLPTE 408 can have a null value until additional snapshot data needs to stored in association with the TLPT 404. Accordingly, when a snapshot of a master volume is taken, a TLPT 404 can be created with TLPTEs 408a-N, where N is typically greater than or equal to one. In one embodiment, upon creation of a snapshot, a TLPT 404 is created with a number of TLPTEs 408a-N. These TLPTEs 408a-N are initially empty (i.e., have a null value). Each TLPTE 408 corresponds to a BLPT 412 and therefore a range of BLPT Entries (BLPTEs) 416. A structure of BLPTEs 416 are also created with each BLPTE 416 being reserved to point at a particular chunk 432 corresponding to a Logical Block Address (LBA) on the master volume. However, since data from the master volume is only written to the backing store when the master volume is being rewritten the BLPTEs 416 are initially null as well. As the operation of the master volume continues some of the TLPTEs 408a-N may eventually have pointers to BLPTs 412, whereas other TLPTEs 408a-N may be empty. A pointer included in a TLPTE 408 is generally stored as a memory address of the BLPT and generally has a size of about 4 bytes but can have a size of up to about 8 bytes. Although the TLPTEs 408a-N are shown being filled in order (i.e., the first TLPTE 408a is filled before the second TLPTE 408b which is filled before the Nth TLPTE 408N), the order in which TLPTEs 408a-N are populated may be arbitrary.

The BLPTs 412a-N contain pointers, stored as BLPTEs 416, that point to actual preserved data or write data for the snapshot associated with the corresponding TLPT 404. In one embodiment, each BLPTE 416a-M represents a range or "chunk" that comprises at least a subset of the snapshot data 432a-K on the backing store 428. An address chunk identifier 420 identifies the location of the corresponding chunk of data 432 on the backing store 428. A chunk 432 stores data that provides a moment in time picture of an LBA on the master volume. Therefore, two different chunks 432 can store data related to the same LBA but taken at different times.

Each chunk 432a-K may be further divided into subchunks via the use of a bitmap 424. The bitmap 424 information stored in the BLPTE 416 can be used to indicate where that subchunk is located within the chunk 432, either on the backing store 428 or on the master volume. In accordance with one embodiment, each chunk 432 corresponds to about 2 MB of memory and each subchunk corresponds to about 64 KB of memory. As can be appreciated by one skilled in the art, the chunk address identifiers 420 for each BLPTE 416 in a BLPT 412 does not need to be assigned to a chunk 432 consecutively as shown in FIG. 4. For example, the Mth BLPTE 416 of the first BLPT 404a could be allocated before first BIPTE 416 of the first BLPT 404a. However, in other embodiments, the BLPTEs 416 could be assigned chunks 432 consecutively to make assignment of chunks more orderly.

The controller 212 uses a hierarchical system of pointers to store snapshot data so that read and write commands for the snapshot data can be quickly and efficiently executed. When a snapshot read command is received by the controller 212, the controller 212 can quickly locate a portion of snapshot data by first identifying the TLPT 404 corresponding to the requested snapshot then drill down to the requested data using the pointers in the TLPT 404 and BLPT 412. If the controller 212 determines that the data is not on the requested snapshot (e.g., 404b), the controller 212 will search for a newer snapshot (e.g., 404a). If the data is not on the newer snapshot (e.g., 404a), then the data will be on the master volume. However in one embodiment, when a newer snapshot is deleted, the controller 212 will want to make certain that data which should be stored on an older snapshot but was stored on the snapshot being deleted is preserved in the older snapshot before the newer snapshot is deleted so that such data is not lost.

Although snapshot data is depicted and described having two levels of entries (i.e., top levels and bottom levels), it can be appreciated by one of skill in the art that a greater or lesser number of levels may be employed. For instance, several levels of entries may be utilized. Additionally, aspects of the present invention may be employed with different levels of indirect page tables.

Figure 5:
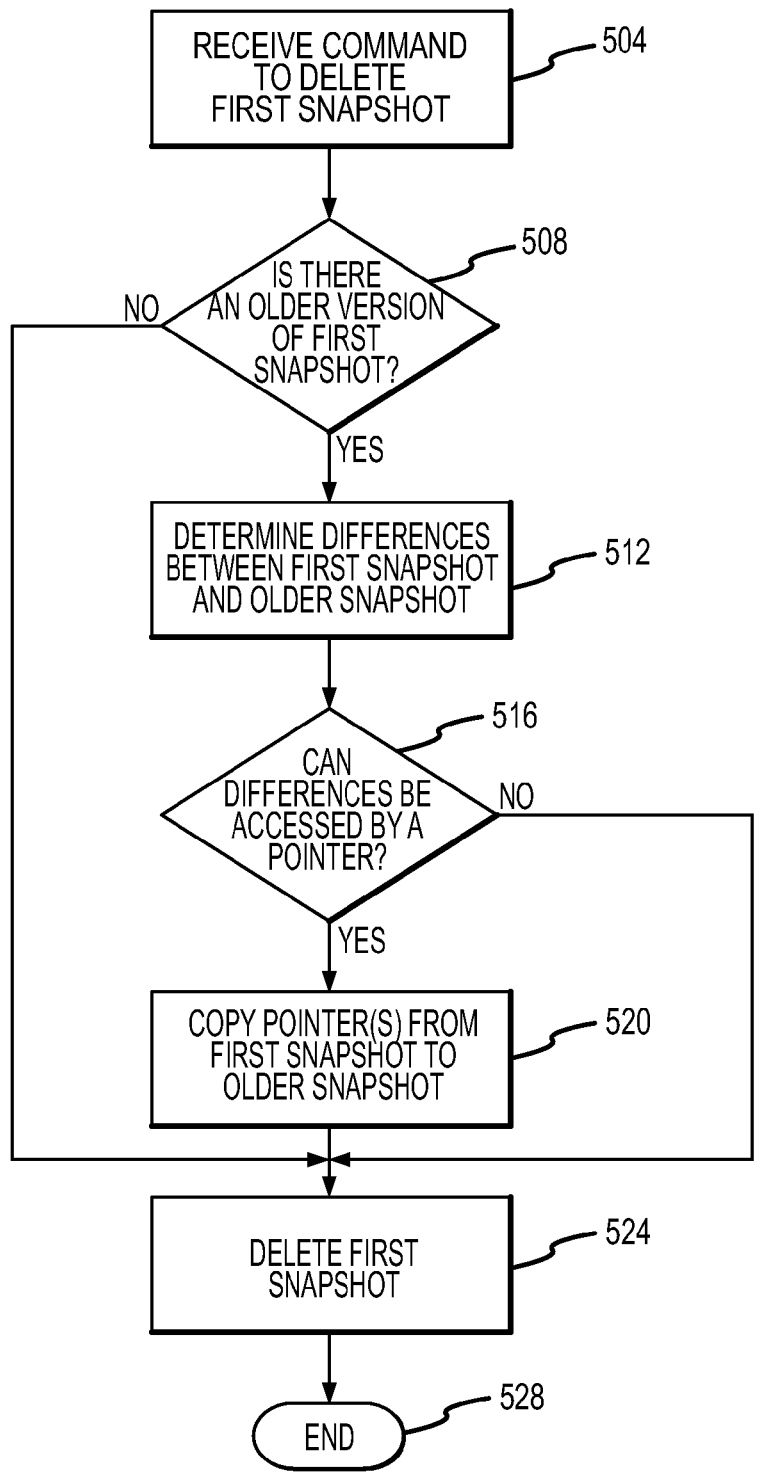
FIG. 5 is a flow chart depicting aspects of a snapshot delete process in accordance with embodiments of the present invention.

Referring now to FIG. 5, a method of deleting a snapshot 404 will be described in accordance with at least some embodiments of the present invention. Initially, the controller 212 receives a command to delete a first snapshot 404a of a master volume (step 504). One reason that a user may wish to delete a snapshot 404 is to free up memory space on the backing store or to erase a snapshot that is preserving corrupted data. Before the first snapshot 404a is deleted, it is determined if there is an older snapshot 404b corresponding to the first snapshot 404a that is to be deleted (step 508). In other words, the controller 212 determines if there is an older snapshot 404*b* of the same master volume that may require data from the newer snapshot 404*a*. A reason why the user may want to delete the newer snapshot 404*a* instead of the older snapshot 404*b* is because the user still wants to keep the point in time picture of the master volume corresponding to the older snapshot 404*b*.

If there are no older snapshots, then the first snapshot 404*a* is deleted (step 524). However, in the event that the controller 212 determines that there is an older snapshot 404*b*, then the controller 212 determines if there are any differences between the first snapshot 404*a* and the older snapshot 404*b* (step 512). The controller 212 identifies differences between the snapshots 404 by evaluating the TLPTEs 408 of each snapshot 404 and comparing the TLPTEs 408 between the snapshots. If each snapshot 404 has values (or nulls) in corresponding TLPTEs 408, then the controller 212 may determine that there is no difference between the snapshots 404 that will require a transfer of data from the first snapshot 404*a* to the older snapshot 404*b*. However, even if the TLPTEs 408 are the same, meaning that both TLPTEs 408 have values, in each snapshot 404, the controller 212 analyzes the BLPTEs 416 of each snapshot 404 looking for differences (e.g., by checking to see if a BLPTE 416 in the older snapshot 404*b* is null and the corresponding BLPTE 416 in the first snapshot 404*a* has a value). After analyzing the various entries associated with each snapshot 404, the controller 212 identifies the differences and determines if the differences can be accessed by simply copying a pointer in the form of a TLPTE 408 or BLPTE 416 from the first snapshot 404*a* to the older snapshot 404*b* (step 516). In the event that a pointer cannot be employed to access the differences, meaning that the first 404*a* and older 404*b* snapshots have a corresponding TLPTE 408 and/or BLPTE 416 pointing to different snapshot data, then the actual data that exists of the first snapshot 404*a* should not be copied to the older snapshot 404*b* because the older snapshot 404*b* already has the data corresponding to the point in time associated with the older snapshot 404*b*. Therefore the method continues with the controller 212 deleting the first snapshot (step 524).

In the event that the differences between the snapshots can be reconciled by copying a pointer, then the controller 212 copies the pointer or corresponding entry 408 and/or 416 from the first snapshot 404*a* to the older snapshot 404*b* (step 520). The entry 408, 416 that is copied from the first snapshot 404*a* to the older snapshot 404*b* generally depends upon the entries 408, 416 stored in the older snapshot 404*b*. If the older snapshot 404*b* has values for TLPTEs 408 corresponding to TLPTEs 408 in the first snapshot 404*a*, then the BLPTEs 416 that differ between the snapshots 404 (i.e., the BLPTEs 416 that have null values in the older snapshot 404*b* but have actual values in the first snapshot 404*a*) will be copied. However, if the older snapshot 404*b* has a null value for a TLPTE 408 corresponding to a TLPTE 408 in the first snapshot 404*a* having a value, then the TLPTE 408 from the first snapshot 404*a* is copied to the older snapshot 404*b*. The BLPTEs 416 in this case do not need to be copied since the BLPTEs 416 are already on the BLPT 412 that is moved to the older snapshot TLPTE 408. By copying the entries 408 and/or 416 instead of the actual data from the backing store 428, the controller 212 is able to reduce the total amount of data that actually has to be transferred from the first snapshot 404*a* to the older snapshot 404*b*. For example, in the past, the chunks of data 432 would have been copied from the first snapshot 404*a* and saved on the older snapshot 404*b*. Therefore, for a system in which each chunk of data was 2 MB in size, if one hundred chunks of data 432 had to be transferred, the controller 212 would have to copy 200 MB of data. However, a controller 212 in accordance with embodiments of the present invention can achieve the same result by only copying the entries 408 and/or 416, which may only correspond to less than a KB of data. After all differences between the first snapshot 404*a* and the older snapshot 404*b* have been reconciled by copying pointers and/or actual data, the controller 212 deletes the first snapshot 404*a* (step 524). Once the controller 212 has deleted the first snapshot 404*a*, the process ends (step 528).

Figure 6:
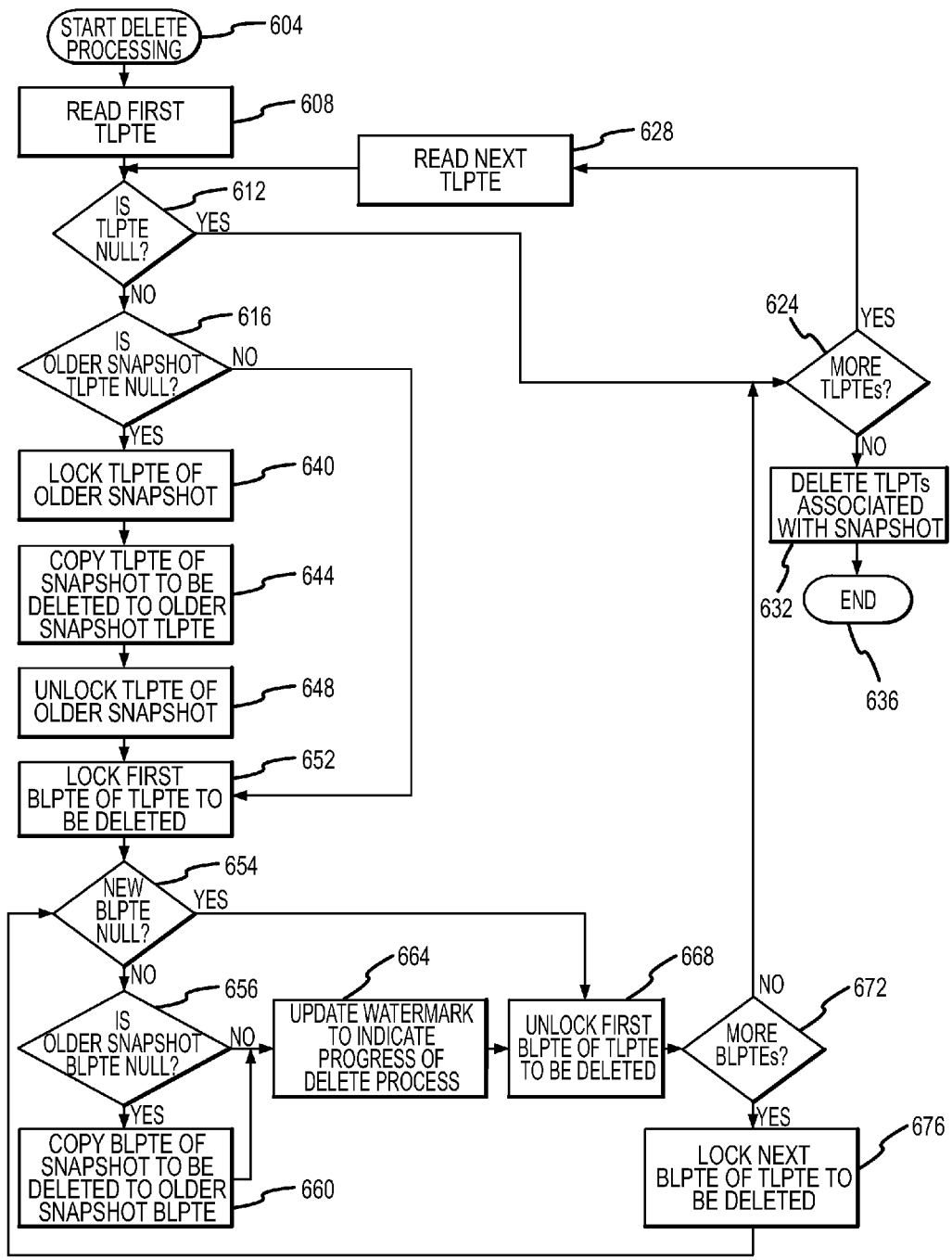
FIG. 6 is a flow chart depicting aspects of incrementally locking and copying portions of snapshot data in accordance with embodiments of the present invention.

FIG. 6 depicts a method of deleting a snapshot 404 by incrementally locking and copying portions of the snapshot 404 to be deleted in accordance with at least some embodiments of the present invention. The method begins when the controller 212 implements the snapshot delete application 320 to start a delete processing routine when deleting a first snapshot 404*a* that also is associated with an older snapshot 404*b* (step 604). The controller 212 generally makes this determination in response to receiving a delete snapshot request from a host computer 112 or administrative computer 116 that has analyzed the backing store to see if there are older snapshots corresponding to the snapshot that is to be deleted. Thereafter, the controller 212 reads the first TLPTE 408*a* of the first TLPT 404*a* corresponding to the first snapshot (step 608). Based on reading the TLPTE 408, the controller 212 determines if the first TLPTE 408*a* is null, meaning that there are no pointers stored in the first TLPTE 408*a* (step 612). In the event that the first TLPTE 408*a* is null, then there is no data that needs to be transferred to the older snapshot 404*b*. Therefore, the controller 212 determines if there are more TLPTEs 408 in the first TLPT 404*a* (step 624). If there is at least a second TLPTE 408*b*, then the controller 212 continues by reading the next TLPTE 408 (step 628). Alternatively, if all of the TLPTEs 408 in the snapshot are processed, then the controller deletes the TLPTs 404 of the first snapshot (step 632). Once all of the TLPTs 404 of the first snapshot are deleted, the method ends (step 636).

However, if the controller 212 determines that the first TLPTE 408*a* does have data stored therein, then the controller 212 checks the first TLPTE 408*a* of the older snapshot 404*b* to see if it has a null value (step 616). In the event that the older snapshot 404*b* does have values in its first TLPTE 408*a* (i.e., the first TLPTE 408*a* of the older snapshot 404*b* is pointing to a BLPT 412), then the TLPTE 408*a* from the older snapshot 404*b* already has data from the point in time corresponding to the older snapshot 404*b*, which means that the TLPTE 408*a* from the first snapshot 404*b* should not be written to the older snapshot 404*a*. Under these circumstances, the controller 212 will lock the first BLPTE 416 of the TLPTE 408 being deleted (step 652).

Referring back to step 616, if the controller 212 determines that the first TLPTE 408*a* of the older snapshot 404*b* is null, the controller 212 implements the locking function 324 to lock the first TLPTE 408*a* of the older snapshot 404*b* (step 640). The locking function 324 is implemented so that the data corresponding to the first TLPTE 408*a* does not become corrupted due to a read/write data command being executed during the transfer of pointers from the first snapshot 404*a* to the older snapshot 404*b*.

With the first TLPTE 408*a* corresponding to the older snapshot 404*b* locked, the controller 212 engages the copy function 328 to copy the value of the first TLPTE 408*a* from the first snapshot 404*a* to the older snapshot 404*b* (step 644). This particular step entails copying the value of the first TLPTE 408*a* and saving the copy of that value in the corresponding TLPTE 408*a* of the older snapshot 404*b* that was previously null.

Once the first TLPTE 408*a* has been successfully copied from the first snapshot 404*a* to the older snapshot 404*b*, the locking function 324 unlocks the first TLPTE 408a of the older snapshot 404b (step 648). Thereafter, the locking function 324 locks the first BLPTE 416a of the first TLPTE 408a of the first snapshot 404a (step 652). The BLPTE 416 is locked so as to prevent data corruption caused by the deletion of the TLPT 404 while the BLPTE 416 is still being accessed by another process. Obtaining a lock guarantees no other process is using the BLPTE 416. The watermark may then be incremented when the lock is in place. The update of the watermark will ensure that no other process will access the BLPTE 416 after the lock is released. Therefore, when the TLPT 404 is deleted, there will be no access allowed to it.

After the first BLPTE 416a is locked, the controller 212 determines if the locked BLPTE 416a has a null value (step 654). If the locked BLPTE 416a has a null value then there is nothing to copy to the older snapshot. Therefore, the controller 212 unlocks the corresponding BLPTE 416a (step 668). On the other hand, if the locked BLPTE 416a is not null (i.e., does have a value), then the controller 212 determines if the first BLPTE 416a from the older snapshot 404b has a null value (step 656). In other words, the controller 212 determines if the locked BLPTE 416 has a counterpart BLPTE 416 in the older snapshot 404b and if so does that counterpart BLPTE 416 have a value. For example, the first BLPTE 416a from the first TLPTE 408a in the first snapshot 404 has a value corresponding to the first address chunk identifier 432a. The first BLPTE 416a from the first TLPTE 408a in the older snapshot 404 also has a value, but that value corresponds to the fifth address chunk identifier 432e and therefore that BLPTE 416 is not null. However, the Mth BLPTE 416M of the first BLPT 412c in the older snapshot 404b does have a null value and does not point to any data chunks.

If the controller 212 determines that the first BLPTE 416a from the older snapshot 404b is null, then the contents of the first BLPTE 416a from the first snapshot 404a are copied by the copy function 328 and stored in the first BLPTE 416a from the older snapshot 404b (step 660). However, in the depicted embodiment, the BLPTE 416 would not be copied from the first snapshot 404a to the older snapshot 404b until the controller 212 gets to the Mth BLPTE 416M because it is the Mth BLBTE 416M that is null. Therefore, if the first BLPTE 416a from the older snapshot 404b is not null, then the older snapshot 404b has the data from the LBA corresponding to the point in time that the older snapshot 404b was taken. After the first BLPTE 416a has been copied, if such a process was necessary, the controller 212 updates a watermark to indicate the progress of the delete process (step 664). The watermark is updated by the marking function 332 after each BLPTE 416 has been updated from the first snapshot 404a to the older snapshot 404b. In accordance with one embodiment, the watermark is used such that other devices such as a host computer 112, an administrative computer 116, and/or a controller 212 from a different storage system 104, 108 can still access other contents of the first snapshot 404a not being copied.

When the marking function 332 is done updating the position of the watermark, the locking function 324 unlocks the first BLPTE 416a from the first snapshot 404a (step 668). Thereafter, the controller 212 determines if there are more BLPTEs 416 in the BLPT 412 corresponding to the first TLPTE 408a (step 672). If more BLPTEs 416 exist in the first BLPT 412a, then the controller utilizes the locking function 324 to lock the next BLPTE 416 from the first snapshot 404a (step 676). Thereafter, the method returns to step 654.

If there are no further BLPTEs 416 in the first BLPT 412a, then the controller 212 analyzes the first snapshot 404a to see if there are additional TLPTEs 408 associated therewith (step 624).

Figure 7:
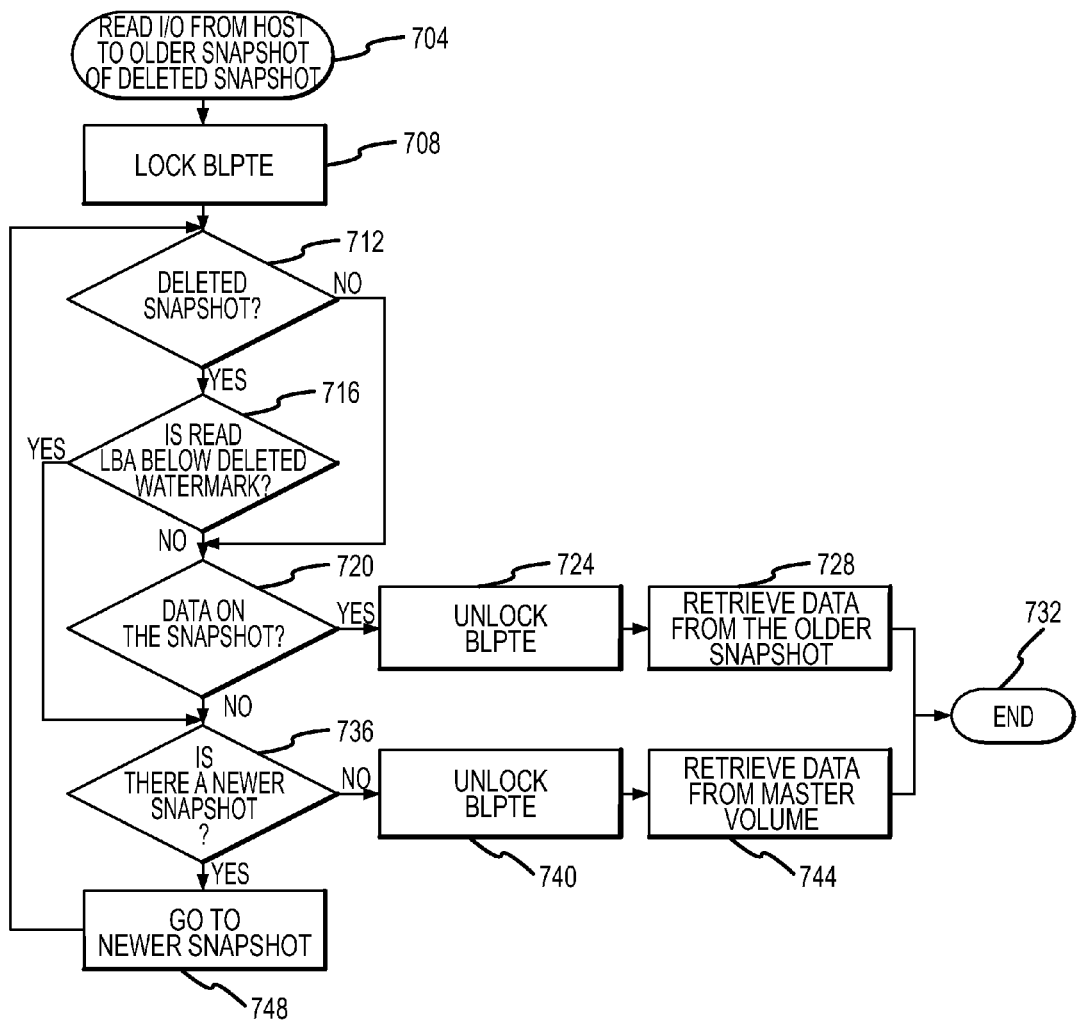
FIG. 7 is a flow chart depicting aspects of reading snapshot data during the delete process in accordance with embodiments of the present invention.

FIG. 7 depicts a method of reading snapshot data while the snapshot is being deleted in accordance with at least some embodiments of the present invention. The method begins with the controller 212 receiving a read I/O command from a host computer 112 or administrative computer 116 (step 704). The read I/O command is for the controller 212 to read snapshot data that is being deleted through an older snapshot 404b. Upon receipt of the read I/O command, the controller activates the locking function 324 to lock the BLPTE 416 corresponding to the data being read from the older snapshot 404b (step 708). In this step, the BLPTE 416 of the older snapshot 404b is locked. After the BLPTE 416 from the older snapshot 404b is locked, the controller 212 determines if there is a deleted snapshot 404 (i.e., a snapshot currently being deleted) from which the older snapshot 404b might need to read data (step 712).

If there is a snapshot 404 currently being deleted and as a result is having some of its data transferred to the older snapshot 404b, then the controller 212 determines if the requested data or chunk 432 corresponding to the requested LBA is below the deletion watermark (step 716). As can be appreciated, the watermark may be an indicator stored in memory 308 of the controller 212 or may be temporary metadata stored in association with one or more of the tables 404, 412. If the chunk 432 corresponding to the requested data is below the watermark (i.e., the data has already been transferred from the snapshot being deleted 404a to the older snapshot 404b) or there is no snapshot 404 currently being deleted, the controller 212 determines if the requested data is on the older snapshot 404b (step 720). If the requested data is on the older snapshot 404b, then the locking function 324 unlocks the corresponding BLPTE 416 (step 724). With the BLPTE 416 unlocked, the controller retrieves the requested data from the corresponding chunk 432 associated with the older snapshot 404b (step 728). Since the table entries 408, 416 are incrementally locked and transferred one at a time, any device can access all portions of snapshot data with the exception of data associated with a currently locked table entry 408, 416. However, the wait time for a particular entry transfer to complete is relatively small in comparison to the amount of time required to transfer an entire snapshot. After the data has been read from the chunk 432, the method ends (step 732).

Alternatively, if the data was not stored on the older snapshot 404b or if the requested data is not on a chunk below the watermark (i.e., the data has not been transferred from the snapshot being deleted 404a to the older snapshot 404b), the controller 212 determines if there is a newer snapshot 404a, which may or may not be the snapshot that is being deleted (step 736). If there is a newer snapshot, then the controller 212 finds the newer snapshot 404a (step 748). Thereafter, the method returns to step 712. On the other hand, if there is not a newer snapshot 404a, then the locking function 324 unlocks the BLPTE 416 (step 740). After the BLPTE 416 has been unlocked, the controller 212 is able to retrieve the requested data from the master storage volume (step 744). After the data has been retrieved, the method ends (step 732).

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art

What is claimed is:

1. A method of deleting snapshot data, comprising:
receiving a command to delete a first snapshot;
determining that a second snapshot exists that is older than the first snapshot;
copying a first table entry containing at least one pointer to snapshot data from the first snapshot;
during the copying step, simultaneously allowing access to a second table entry containing the at least one pointer to snapshot data from the first snapshot;
storing the first table entry in the second snapshot; and
deleting the first snapshot.

2. The method of claim 1, wherein the first table entry is copied to the second snapshot in the event that a table entry of the second snapshot for a common logical block address is not used.

3. The method of claim 1, wherein the first table entry that is copied comprises a top level page table entry stored in a top level page table, wherein the top level page table comprises a list of pointers to different bottom level page tables.

4. The method of claim 3, further comprising allowing bottom level page table entries in the top level page table entry to be accessed by the second snapshot during at least one of the copying and deleting step.

5. The method of claim 3, wherein the bottom level page tables comprise entries that point to preserved snapshot data.

6. The method of claim 1, further comprising:
locking the first table entry prior to the copying step; and
unlocking the first table entry after the storing step is complete.

7. The method of claim 6, wherein the first table entry comprises a top level page table entry that contains a list of pointer to bottom level page tables, the method further comprising:
locking a first bottom level page table entry of a first bottom level page table;
updating a watermark to indicate that the deletion process for the first snapshot has completed up to the locked first bottom level page table entry; and
unlocking the first bottom level page table entry.

8. The method of claim 6, wherein the first table entry comprises a bottom level page table entry that contains a list of pointers to stored data, the method further comprising:
locking a first bottom level page table entry of a first bottom level page table;
waiting for a copying of the first bottom level page table entry to complete;
updating a watermark to indicate that the deletion process for the first snapshot has completed up to the locked first bottom level page table entry; and
unlocking the first bottom level page table entry.

9. The method of claim 8, further comprising:
determining that a second bottom level page table entry exists in the first bottom level page table;
locking the second bottom level page table entry;
determining that the deletion process for the first snapshot has completed up to the locked second bottom level page table entry;
updating a watermark to indicate that the deletion process for the first snapshot has completed up to the locked second bottom level page table entry; and
unlocking the second bottom level page table entry.

10. A device for controlling a storage system, comprising:
a memory including a snapshot delete application, the snapshot delete application comprising:
a locking function for locking a first portion of data of a first snapshot while the first snapshot is being deleted and simultaneously allowing access to a second portion of data of the first snapshot;
a copy function for copying the locked first portion of data from the first snapshot to a second older snapshot; and
a processor for executing the snapshot delete application.

11. The device of claim 10, wherein the first portion of data comprises a table entry that is being copied.

12. The device of claim 11, wherein portions of snapshot data related to the second snapshot other than the portion being copied can be accessed by a second device while the snapshot delete application is deleting the first snapshot.

13. The device of claim 11, wherein the table entry comprises a top level page table having at least one top level page table entry, each top level page table entry comprising a pointer to a different bottom level page table.

14. The device of claim 11, wherein the table entry comprises at least one bottom level page table entry in a bottom level page table, each bottom level page table entry comprising a pointer to data from the first snapshot.

15. The device of claim 14, wherein the at least one bottom level page table entry comprises at least one of (i) a pointer to a chunk allocated from a storage device for storing a portion of the first snapshot and (ii) a bitmap identifying a location of a subchunk in the chunk.

16. The device of claim 15, wherein the bitmap is used to indicate if the subchunk has been used.

17. The device of claim 10, further comprising a marking function that identifies the first portion of data that is locked by the locking function and updates as the locking function incrementally moves from the first portion to other portions of the first snapshot.

18. An electronic data system, comprising:
at least a first data storage system comprising:
means for storing data; and
means for controlling the flow of data to and from the means for storing data, wherein the means for controlling comprises:
means for receiving a command to delete a first snapshot stored on the means for storing data;
means for copying a first table entry containing at least one pointer to snapshot data from the first snapshot to a second older snapshot;
means for providing access to a second table entry containing the at least one pointer to snapshot from the first snapshot while the first table entry is being copied; and
means for deleting the first snapshot.

19. The system of claim 18, wherein at least one of a controller from a second data storage system, an administrative computer, and a host computer employs the means for providing access while the first table entry is being copied.

20. The system of claim 18, wherein the means for controlling can perform read and write operations on the snapshot data while the table entry is being copied.

* * * * *